United States Patent
Kadono et al.

(10) Patent No.: US 8,765,067 B1
(45) Date of Patent: Jul. 1, 2014

(54) EXHAUST GAS OXIDATION CATALYST

(75) Inventors: Takeshi Kadono, Tochigi (JP); Satoshi Sumiya, Tochigi (JP); Lifeng Wang, Tochigi (JP)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/122,051

(22) PCT Filed: May 25, 2012

(86) PCT No.: PCT/GB2012/051190
§ 371 (c)(1),
(2), (4) Date: Jan. 3, 2014

(87) PCT Pub. No.: WO2012/160391
PCT Pub. Date: Nov. 29, 2012

Related U.S. Application Data

(60) Provisional application No. 61/586,447, filed on Jan. 13, 2012.

(30) Foreign Application Priority Data

May 25, 2011 (JP) .................................. 2011-117314
Jan. 25, 2012 (GB) .................................. 1201218.3

(51) Int. Cl.
*B01D 50/00* (2006.01)
*B01J 29/06* (2006.01)

(52) U.S. Cl.
USPC .............. 422/171; 422/177; 502/64; 502/100

(58) Field of Classification Search
USPC .............. 422/171, 177, 180; 502/60, 64, 100; 60/274, 299
See application file for complete search history.

(56) References Cited

U.S. PATENT DOCUMENTS 5,491,120 A 2/1996 Voss et al.
5,627,124 A 5/1997 Farrauto et al.
(Continued)

FOREIGN PATENT DOCUMENTS

DE 602004001262 4/2007
EP 0931590 7/1999
(Continued)

OTHER PUBLICATIONS

International Search Report dated Jul. 27, 2012 for corresponding PCT International Patent Application No. PCT/GB2012/051190 filed May 25, 2012.
(Continued)

*Primary Examiner* — Tom Duong
(74) *Attorney, Agent, or Firm* — Kevin M. Carroll

(57) ABSTRACT

An exhaust gas oxidation catalyst characterized as an exhaust gas oxidation catalyst comprising a catalyst substrate, wherein a plurality of exhaust gas channels has been formed, and a catalyst layer formed on the surface of the exhaust gas channels in the catalyst substrate; wherein a catalyst layer consisting of a bottom catalyst layer, a top catalyst layer exposed within the exhaust gas channels, and an intermediate catalyst layer located between the bottom catalyst layer and top catalyst layer, is provided so as to cover not less than 25% of the exhaust gas channel surface, and wherein the bottom catalyst layer contains at least an oxygen-occluding agent as catalyst component but does not contain a hydrocarbon adsorbent, the intermediate catalyst layer contains at least catalyst metal, supported on a metal oxide support, and a hydrocarbon adsorbent as catalyst components, and the top catalyst layer contains at least an oxygen-occluding agent and a hydrocarbon adsorbent as catalyst components.

18 Claims, 1 Drawing Sheet

5 Catalyst layer
6 Bottom catalyst layer
7 Intermediate catalyst layer
8 Top catalyst layer

(56) References Cited

U.S. PATENT DOCUMENTS

| | | |
|---|---|---|
| 6,617,276 B1 * | 9/2003 | Ballinger et al. ............... 502/66 |
| 7,276,212 B2 * | 10/2007 | Hu et al. ....................... 422/177 |
| 7,749,472 B2 * | 7/2010 | Chen et al. ................. 423/213.2 |
| 2001/0006934 A1 * | 7/2001 | Kachi et al. .................. 502/325 |
| 2003/0027719 A1 | 2/2003 | Kawabata et al. |
| 2005/0282701 A1 | 12/2005 | Foong et al. |
| 2007/0051094 A1 | 3/2007 | Tanada |
| 2008/0038172 A1 | 2/2008 | Chen et al. |
| 2008/0045405 A1 | 2/2008 | Beutel et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0183490 A1 | 7/2010 | Hoke et al. |
| 2010/0290964 A1 | 11/2010 | Southward et al. |

FOREIGN PATENT DOCUMENTS

| | | |
|---|---|---|
| EP | 1468721 | 10/2004 |
| EP | 2213371 | 8/2010 |
| EP | 2308595 | 4/2011 |
| WO | 2008097702 | 8/2008 |
| WO | 2010083357 | 7/2010 |

OTHER PUBLICATIONS

Great Britain Search Report dated May 1, 2012 for corresponding GB Application No. GB1201218.3 filed Jan. 25, 2012.

* cited by examiner

1 Exhaust gas oxidation catalyst
2 Exhaust gas channel
3 Catalyst substrate
4 Exhaust gas channel wall 5 Catalyst layer
6 Bottom catalyst layer
7 Intermediate catalyst layer
8 Top catalyst layer

EXHAUST GAS OXIDATION CATALYST

CROSS-REFERENCE TO RELATED APPLICATIONS

This application is the U.S. national stage application, under 35 U.S.C. §371, of International Application PCT/GB2012/051190, filed May 25, 2012, claiming priority to Japanese Application No. 2011-117314, filed May 25, 2011, U.S. Provisional Application No. 61/586,447, filed Jan. 13, 2012 and Great Britain Application No. 1201218.3 filed Jan. 25, 2012 each of which are incorporated herein by reference.

The invention relates to an exhaust gas oxidation catalyst for the clean-up of exhaust gas discharged from internal combustion engines, especially diesel engines.

Exhaust gas cleaning catalysts are used to prevent pollution by the exhaust gas discharged from internal combustion engines, and the catalysts being developed for diesel engines include oxidation catalysts and nitrogen oxide occlusion-reduction catalysts.

An oxidation catalyst renders the noxious substances in exhaust gas, such as carbon monoxide (CO), unburned hydrocarbon (HC), and soluble organic fraction (SOF), harmless by decomposition to carbon dioxide, water, etc. U.S. Pat. Nos. 5,627,124 and 5,491,120 disclose oxidation catalysts which use a catalyst layer, formed in the exhaust gas channels of a substrate of honeycomb form provided with numerous exhaust gas channels, wherein the catalyst layer contains metal oxides such as cerium oxide, aluminium oxide, titanium oxide, and zirconium oxide and complexes thereof, and which further contain noble metals such as platinum and palladium. Since an oxidation catalyst has scant function in oxidising noxious substances such as HC if the exhaust gas temperature is low as in low speed running, various means have been devised to adsorb the HC at low temperature and then oxidise the HC liberated when the exhaust gas has reached a sufficiently high temperature; and one means proposed is to constitute the catalyst layer so as to increase the amount of HC adsorbed (see for example US Patent publication No. 2010/0180582).

In order to increase the amount of HC occluded at low exhaust gas temperature, the catalyst layer provided in the exhaust gas channels in the oxidation catalyst disclosed in US Patent publication No. 2010/0180582 is constituted from three layers: a bottom layer containing at least a molecular sieve, an intermediate layer that contains a noble metal supported on a refractory metal oxide but does not contain a molecular sieve, and a top layer containing at least a molecular sieve. However, even though the oxidation catalyst disclosed in US Patent publication No. 2010/0180582 offers improved HC adsorption in low speed running, such catalyst has been problematic in that HC adsorption efficacy tends to deteriorate in continuous running at low temperature, as in idling for example, and the level of CO removal is hardly satisfactory since the recoverability of the catalyst from sulphur poisoning due to sulphur compounds in the exhaust gas cannot be considered adequate. The present invention was devised to solve the problems with the exhaust gas oxidation catalysts of the aforesaid prior art, its aim being to provide an exhaust gas catalyst whereby the existing problems can be solved.

According to a first aspect, the invention provides an exhaust gas oxidation catalyst characterised as comprising a catalyst substrate, wherein a plurality of exhaust gas channels has been formed, and a catalyst layer formed on the surface of the exhaust gas channels in the catalyst substrate; wherein a catalyst layer consisting of a bottom catalyst layer, a top catalyst layer exposed in the exhaust gas channels, and an intermediate catalyst layer located between the bottom catalyst layer and top catalyst layer, is provided so as to cover not less than 25% of the exhaust gas channel surface, and wherein the bottom catalyst layer contains at least an oxygen occluding agent as catalyst component but does not contain a hydrocarbon adsorbent, the intermediate layer contains at least a catalyst metal, supported on a metal oxide support, and a hydrocarbon adsorbent as catalyst components, and the top catalyst layer contains at least an oxygen occluding agent and hydrocarbon adsorbent as catalyst components.

In one embodiment, the intermediate catalyst layer comprises not less than two layers with different catalyst components and/or catalyst content.

In a further embodiment, as well as an oxygen occluding agent and hydrocarbon adsorbent, the top catalyst layer contains catalyst metal supported on a metal oxide support.

In a further embodiment, the hydrocarbon adsorbent is zeolite.

According to a second aspect, the invention provides an exhaust system for a diesel internal combustion engine comprising the exhaust gas oxidation catalyst according to any preceding claim.

The inventive exhaust gas oxidation catalyst has outstanding efficacy in removing CO and HC, is resistant to decline in HC adsorption in low speed running, recovers rapidly from sulphur poisoning of the catalyst, and can effectively oxidise the noxious substances in exhaust gas, rendering them harmless.

In order that the invention may be more fully understood, embodiments of the present invention will be described with reference to the accompanying drawings, in which.

Figure 1:
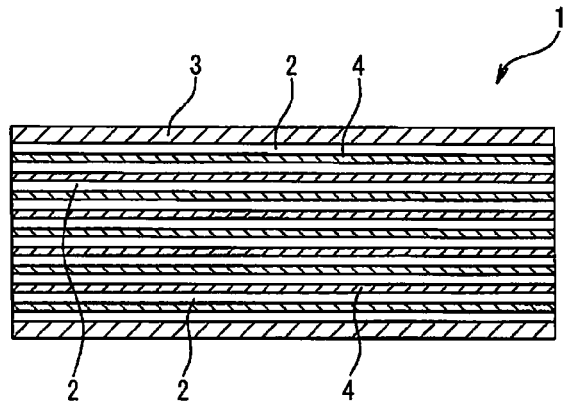
FIG. 1 is a view in longitudinal section showing an embodiment of the inventive exhaust gas oxidation catalyst.
Figure 2:
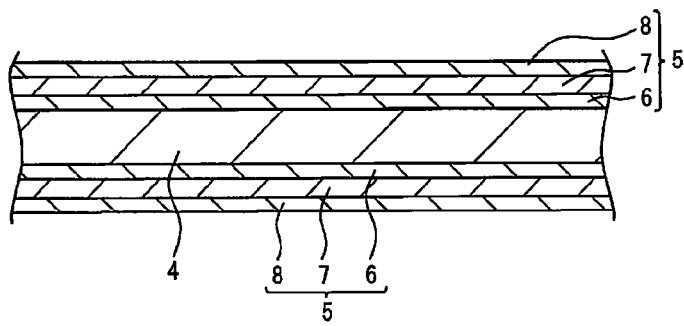
FIG. 2 is an enlarged sectional view showing the constitution of the catalyst layer.

FIG. 1 shows an embodiment of the inventive exhaust gas oxidation catalyst; the exhaust gas oxidation catalyst illustrated embodies a constitution wherein a catalyst layer 5 as shown in FIG. 2 has been provided on the walls 4 of the exhaust gas channels 2 in a catalyst substrate 3 containing a plurality of exhaust gas channels 2. The catalyst substrate 3 used comprises cordierite, metal, silicon carbide, silicon nitride, aluminium nitride, or the like. Although a catalyst substrate 3 of honeycomb cylindrical form that has a plurality of exhaust gas channels 2 running from one face through to the other face of the cylinder can normally be used, the substrate can also be a porous body in fibre form, sheet form, ceramic form, etc.

As indicated in FIG. 2, the catalyst layer 5 is constituted from three layers: a bottom catalyst layer 6 that contains at least an oxygen-occluding agent but does not contain a hydrocarbon adsorbent as catalyst component, an intermediate catalyst layer 7 containing at least a catalyst metal supported on a metal oxide support as catalyst components and a hydrocarbon adsorbent, and a top catalyst layer 8 containing at least an oxygen-occluding agent and hydrocarbon adsorbent as catalyst components. The bottom catalyst layer 6 is provided so as to cover the walls 4 of the exhaust gas channels 2, the top catalyst layer 8 is exposed within the exhaust gas channels 2, and the intermediate catalyst layer 7 is located between the bottom catalyst layer 6 and the top catalyst layer 8.

The respective catalyst layers can be formed by applying a coating of a catalyst layer forming slurry wherein the catalyst components have been dispersed in water, and then drying and calcining. Methods of applying a coating of slurry to the catalyst substrate 3 may be listed as including dipping the catalyst substrate 3 in the slurry or flushing slurry into the exhaust gas channels 2 of the catalyst substrate 3. After the slurry has been coated on the catalyst substrate 3 and dried, it can usually be calcined at a temperature of 700° C. or less to form the catalyst layer.

A catalyst component of oxygen-occluding agent dispersed in water can be used as the slurry for forming the bottom catalyst layer 6. Although any of cerium oxide, a complex oxide of cerium and zirconium, and compounds wherein an element such as La, Pr or Nd has been added to the said oxides, can be used as the oxygen-occluding agent, a complex oxide of cerium and zirconium is preferred. Since the bottom catalyst layer 6 is formed using a slurry that does not contain hydrocarbon adsorbent or catalyst metals, no hydrocarbon adsorbent is contained in the bottom catalyst layer 6, but catalyst metal that has migrated from the intermediate catalyst layer 7 formed over the bottom catalyst layer 6 may be contained therein. If catalyst metal that has migrated from the intermediate catalyst layer 7 is contained in the bottom catalyst layer 6, the proportion thereof is usually no more than 5 wt % of the overall catalyst metal content.

The intermediate catalyst layer 7 can be formed by coating a slurry of catalyst metal compounds, a metal oxide support for supporting the catalyst metal, and a hydrocarbon adsorbent, dispersed in water, or a slurry of metal oxide support whereon catalyst metal has been supported and a hydrocarbon adsorbent, dispersed in water, over the bottom catalyst layer 6 on a catalyst substrate 3 whereon a bottom catalyst layer 6 has been formed, then drying and calcining. The catalyst metal in the intermediate catalyst layer 7 exists as catalyst metal supported on metal oxide. The nitrate, acetate, hydrochloride, ammine salt, etc, of a metal such as platinum, palladium, iridium, gold or silver is used as the catalyst metal compound in the slurry for forming the intermediate catalyst layer 7; platinum nitrate, ammines of platinum, and palladium nitrate are preferred. An aluminium oxide such as α-alumina or γ-alumina, zirconium oxide, silicon oxide, titanium oxide, their mixtures and their complex oxides are used as the metal oxide support; aluminium oxide and mixtures or complex oxides containing aluminium oxide are preferred, and γ-alumina and mixtures or complex oxides containing γ-alumina are especially preferred. The proportion of other metal oxides in the mixtures or complex oxides with γ-alumina preferably falls in the range 1-30 wt %. A powder of mean particle size 1-10 μm is preferably used as the metal oxide support. For a slurry wherein catalyst metal compounds and catalyst oxide support are dispersed, the proportion of catalyst metal compounds to metal oxide support preferably falls in the range 0.2-5.0 wt % of metal oxide compound with respect to the combined weight of both. The hydrocarbon adsorbents that can be used include mesoporous materials, or microporous materials such as zeolite or a metallosilicate of structure wherein the silicon or aluminium in a zeolite crystal lattice is replaced with a transition metal, though zeolite is preferred. Zeolites of BEA, FAU, MFI, FER, CHA type, etc, may be listed as the zeolite, one or two or more whereof can be used together, though a zeolite with three-dimensional porosity is preferred. A hydrocarbon adsorbent that has a trapping function matching the hydrocarbon species contained in exhaust gas is preferably chosen for use as the hydrocarbon adsorbent.

The top catalyst layer 8 can be formed by coating a slurry containing an oxygen-occluding agent and hydrocarbon adsorbent over the intermediate catalyst layer 7, drying and firing. The oxygen-occluding agent and hydrocarbon adsorbent that can be used are the same as for the bottom catalyst layer 6 and intermediate catalyst layer 7.

If necessary, a binder, inorganic fibre, etc, may be incorporated in the slurry used to form the bottom catalyst layer 6, intermediate catalyst layer 7 and top catalyst layer 8. Aluminium oxide, which functions also as a metal oxide support, is normally used as binder, although it is also possible to use titanium oxide, silicon oxide, etc. Mullite fibre, titania fibre, silica fibre, fibrous boehmite, etc, can be used as the inorganic fibre.

The foregoing example illustrates the case where the bottom catalyst layer 6 is formed by coating a slurry containing catalyst metal compounds and metal oxide support (or a metal oxide support supporting catalyst metal) on the walls 4 of the exhaust gas channels 2 in a catalyst substrate 3, then drying and calcining, but it is also possible to form the catalyst substrate 3 and bottom catalyst layer 6 integrally by moulding the bottom catalyst layer slurry into a honeycomb cylinder, for example, then drying and calcining.

Figure 3:
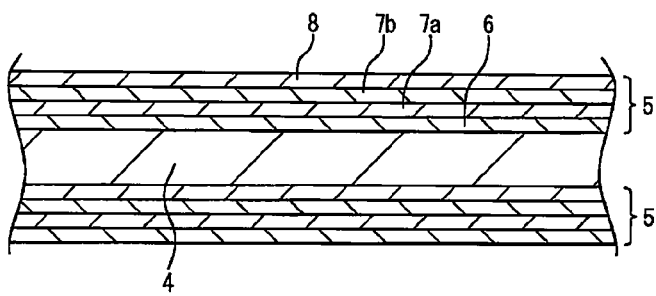
FIG. 3 is an enlarged sectional view showing the constitution of the catalyst layer in another embodiment of the inventive exhaust gas oxidation catalyst.

Although the foregoing example illustrates the case where the intermediate catalyst layer 7 is constituted as a single layer, the intermediate catalyst layer 7 can also be constituted as two layers, a first layer 7a and second layer 7b, or a plurality of two or more layers, as shown in FIG. 3. When the intermediate catalyst layer 7 is constituted as a plurality of two or more layers, each layer (the first layer 7a, second layer 7b, and so on) can be formed from a slurry of different catalyst metal and content thereof, different metal oxide support, etc, or from a slurry of the same catalyst metal at a different content. Versatility in treating exhaust gas containing noxious substances in different proportions can be enhanced by constituting the intermediate catalyst layer 7 as a plurality of layers whose catalyst metals, metal oxide supports and contents thereof, etc, are different.

The inventive exhaust gas oxidation catalyst 1 may contain catalyst metal as well as oxygen-occluding agent and hydrocarbon adsorbent in the top catalyst layer 8. When catalyst metal is so incorporated, it is supported on a metal oxide support. Incorporating catalyst metal in the top catalyst layer 8 not only improves performance in suppressing decline in HC trapping function during low-speed running, it can also improve the fuel combustion properties during DPF forced regeneration.

The contents of the aforesaid oxygen-occluding agent, hydrocarbon adsorbent, and catalyst metal in the inventive exhaust gas oxidation catalyst 1 in relation to the volume (L) of exhaust gas oxidation catalyst 1 are preferably 10-20 g/L of oxygen-occluding agent, 5-30 g/L of hydrocarbon adsorbent and 0.1-5.0 g/L of catalyst metal. The content of oxygen-occluding agent is preferably constituted so that 20-50 wt % of the overall oxygen-occluding agent content is contained in the bottom catalyst layer 6 and 50-80 wt % of the overall oxygen-occluding agent content is contained in the top catalyst layer 8. The content of hydrocarbon adsorbent is preferably constituted so that 30-50 wt % of the overall hydrocarbon adsorbent content is contained in the intermediate catalyst layer 7 and 50-70 wt % of the overall hydrocarbon adsorbent is contained in the top catalyst layer 8. Where catalyst metal is additionally contained in the top catalyst layer 8, the proportion of catalyst metal contained therein is preferably set at 1-10 wt % of the overall catalyst metal content.

The catalyst layer 5 comprising the bottom catalyst layer 6, the intermediate catalyst layer 7 and the top catalyst layer 8 in the inventive exhaust gas oxidation catalyst 1 need not be provided over the whole of the exhaust gas channel 2 from the exhaust gas inlet end to the exhaust gas exit end: although it may be provided contiguously or non-contiguously as long as it is provided on not less than 25% of the surface of the total length of the exhaust gas channel 2, it is preferably provided on not less than 30%, more preferably not less than 40% and in particular preferably not less than 50% of the surface of the total length of the exhaust gas channel 2. The catalyst layer 5 is preferably provided on not less than 25% of the surface of the total length of the exhaust gas channel 2 proceeding from the exhaust gas inlet end of the exhaust gas channel 2 towards the exhaust gas exit end, and in particular preferably provided contiguously thereon. If the catalyst layer 5 is provided on a length less than 100% of the total length of the exhaust gas channel 2 proceeding from the exhaust gas inlet end of the exhaust gas channel 2 towards the exhaust gas exit end, a heretofore known catalyst layer may usually be provided on that part of the exhaust gas channel 2 not provided with the catalyst layer 5, in which case it is permissible for the intermediate catalyst layer in the catalyst layer 5 to extend onto the part not provided with the catalyst layer 5 comprising a bottom catalyst layer 6, intermediate catalyst layer 7 and top catalyst layer 8.

By way of illustration only, the invention is described in greater detail hereunder with working examples.

WORKING EXAMPLE 1

The following slurries for forming the respective catalyst layers were prepared.
1) Bottom catalyst layer: A slurry containing cerium oxide-zirconium oxide complex as oxygen-occluding agent and aluminium oxide (oxygen-occluding agent 63 wt %, aluminium oxide 37 wt %).
2) Intermediate catalyst layer slurry: A slurry containing β-zeolite as hydrocarbon adsorbent, platinum and palladium as catalyst metals (added as platinum nitrate and palladium nitrate), and aluminium oxide (hydrocarbon adsorbent 11.2 wt %, platinum 1.6 wt %, palladium 0.8 wt %, aluminium oxide 86.4 wt %).
3) Top catalyst layer slurry: A slurry containing cerium oxide-zirconium oxide complex as oxygen-occluding agent, platinum as catalyst metal (added as platinum nitrate), β-zeolite as hydrocarbon adsorbent, and aluminium oxide (oxygen-occluding agent 27 wt %, β-zeolite hydrocarbon adsorbent 45 wt %, platinum 0.1 wt %, aluminium oxide 27.9 wt %).

A honeycomb catalyst substrate (NGK product, 1 L) was immersed in the bottom catalyst layer slurry, which was coated to give a deposit when dry of 49 g/L, dried and then calcined at 500° C. to form a bottom catalyst layer. The intermediate catalyst layer slurry was then coated over the bottom catalyst layer to give a deposit when dry of 110 g/L, dried and then calcined at 500° C. to form an intermediate catalyst layer. The top catalyst layer slurry was then coated over the intermediate catalyst layer to give a deposit when dry of 50 g/L, dried and then calcined at 500° C. to form a top catalyst layer, affording an exhaust gas oxidation catalyst with a triple catalyst layer (triple catalyst layer coverage 100% as a proportion of exhaust gas channel surface).

WORKING EXAMPLE 2

The following slurries for forming the respective catalyst layers were prepared.
1) Bottom catalyst layer: A slurry containing cerium oxide-zirconium oxide complex as oxygen-occluding agent and aluminium oxide (oxygen-occluding agent 63 wt %, aluminium oxide 37 wt %).
2) Intermediate catalyst layer slurry: A slurry containing β-zeolite and ZSM5 zeolite as hydrocarbon adsorbents, platinum and palladium as catalyst metals (added as platinum nitrate and palladium nitrate), and aluminium oxide (β-zeolite 5 wt % and ZSM5 zeolite 5 wt % as hydrocarbon adsorbents, platinum 1.1 wt %, palladium 0.5 wt %, aluminium oxide 88.4 wt %).
3) Top catalyst layer slurry: A slurry containing cerium oxide-zirconium oxide complex as oxygen-occluding agent, platinum as catalyst metal (added as platinum nitrate), β-zeolite and ZSM5 zeolite as hydrocarbon adsorbents, and aluminium oxide (oxygen-occluding agent 27.4 wt %, β-zeolite 22.5 wt % and ZSM5 zeolite 22.5 wt % as hydrocarbon adsorbents, platinum 0.1 wt %, aluminium oxide 27.5 wt %).

A honeycomb catalyst substrate (NGK product, 1 L) was immersed in the bottom catalyst layer slurry, which was coated to give a deposit when dry of 49 g/L, dried and then calcined at 500° C. to form a bottom catalyst layer. The intermediate catalyst layer slurry was then coated over the bottom catalyst layer to give a deposit when dry of 110 g/L, dried and then calcined at 500° C. to form an intermediate catalyst layer. The top catalyst layer slurry was then coated over the intermediate catalyst layer to give a deposit when dry of 60 g/L, dried and then calcined at 500° C. to form a top catalyst layer, affording an exhaust gas oxidation catalyst with a triple catalyst layer (triple catalyst layer coverage 100% as a proportion of exhaust gas channel surface).

WORKING EXAMPLE 3

The following slurries for forming the respective catalyst layers were prepared.
1) Bottom catalyst layer: A slurry containing cerium oxide-zirconium oxide complex as oxygen-occluding agent and aluminium oxide (oxygen-occluding agent 63 wt %, aluminium oxide 37 wt %).
2) Intermediate catalyst layer slurry: A slurry containing β-zeolite as hydrocarbon adsorbent, platinum and palladium as catalyst metals (added as platinum nitrate and palladium nitrate), and aluminium oxide (β-zeolite 9 wt % as hydrocarbon adsorbent, platinum 1.1 wt %, palladium 0.5 wt %, aluminium oxide 89.4 wt %).
3) Top catalyst layer slurry: A slurry containing cerium oxide-zirconium oxide complex as oxygen-occluding agent, platinum as catalyst metal (added as platinum nitrate), β-zeolite as hydrocarbon adsorbent, and aluminium oxide (oxygen-occluding agent 31 wt %, β-zeolite as hydrocarbon adsorbent 36 wt %, aluminium oxide 33 wt %).

A honeycomb catalyst substrate (NGK product, 1 L) was immersed in the bottom catalyst layer slurry, which was coated to give a deposit when dry of 55 g/L, dried and then calcined at 500° C. to form a bottom catalyst layer. The intermediate catalyst layer slurry was then coated over the bottom catalyst layer to give a deposit when dry of 110 g/L, dried and then calcined at 500° C. to form an intermediate catalyst layer. The top catalyst layer slurry was then coated over the intermediate catalyst layer to give a deposit when dry of 60 g/L, dried and then calcined at 500° C. to form a top catalyst layer, affording an exhaust gas oxidation catalyst with a triple catalyst layer (triple catalyst layer coverage 100% as a proportion of exhaust gas channel surface).

COMPARATIVE EXAMPLE 1

An exhaust gas oxidation catalyst was produced without forming a bottom catalyst layer containing oxygen-occluding agent, using the following slurries for forming a catalyst metal layer and a top catalyst layer.

1) Slurry for forming a layer containing catalyst metal: A slurry containing platinum and palladium as catalyst metals (added as platinum nitrate and palladium nitrate) and aluminium oxide (platinum 1.0 wt %, palladium 0.5 wt %, inorganic support 98.5 wt %).

2) Top catalyst layer slurry: A slurry containing β-zeolite as hydrocarbon adsorbent, platinum as catalyst metal (added as platinum nitrate), and aluminium oxide (β-zeolite as hydrocarbon adsorbent 63.9 wt %, platinum 0.1 wt %, aluminium oxide 36 wt %).

A honeycomb catalyst substrate (NGK product, 1 L) was immersed in the slurry for forming a layer containing catalyst metal, which was coated to give a deposit when dry of 178 g/L, dried and then calcined at 500° C. to form a catalyst metal-containing layer. The top catalyst layer slurry was then coated over the catalyst metal-containing layer to give a deposit when dry of 60 g/L, dried and then calcined at 500° C. to form a top catalyst layer, affording an exhaust gas oxidation catalyst with a dual catalyst layer (dual catalyst layer coverage 100% as a proportion of exhaust gas channel surface).

COMPARATIVE EXAMPLE 2

A slurry containing β-zeolite as hydrocarbon adsorbent, platinum and palladium as catalyst metals (added as platinum nitrate and palladium nitrate), and aluminium oxide (β-zeolite as hydrocarbon adsorbent 47.72 wt %, platinum 1.44 wt % and palladium 0.72 wt % as catalyst metals, aluminium oxide 50.12 wt %) was coated on a honeycomb catalyst substrate (NGK product, 1 L) to give a deposit when dry of 180 g/L, dried and then calcined at 500° C. to form a catalyst layer; an exhaust gas oxidation catalyst with a single catalyst layer containing catalyst metals was thereby obtained (single catalyst layer coverage 100% as a proportion of exhaust gas channel surface).

COMPARATIVE EXAMPLE 3

The following slurries were prepared to form the respective catalyst layers.

1) Bottom catalyst layer slurry: A slurry containing aluminium oxide 100 wt % (containing no oxygen-occluding agent).

2) Intermediate catalyst layer slurry: A slurry containing β-zeolite as hydrocarbon adsorbent, platinum and palladium as catalyst metals (added as platinum nitrate and palladium nitrate), and aluminium oxide (β-zeolite 11.2 wt % as hydrocarbon adsorbent, platinum 1.6 wt %, palladium 0.8 wt %, aluminium oxide 86.4 wt %).

3) Top catalyst layer slurry: A slurry containing β-zeolite as hydrocarbon adsorbent, platinum as catalyst metal (added as platinum nitrate), and aluminium oxide (contains no oxygen-occluding agent; β-zeolite as hydrocarbon adsorbent 63.9 wt %, platinum 0.1 wt %, aluminium oxide 36 wt %).

A honeycomb catalyst substrate (NGK product, 1 L) was immersed in the bottom catalyst layer slurry, which was coated to give a deposit when dry of 49 g/L, dried and then calcined at 500° C. to form a bottom catalyst layer. The intermediate catalyst layer slurry was then coated over the bottom catalyst layer to give a deposit when dry of 110 g/L, dried and then calcined at 500° C. to form an intermediate catalyst layer. The top catalyst layer slurry was then coated over the intermediate catalyst layer to give a deposit when dry of 50 g/L, dried and then calcined at 500° C. to form a top catalyst layer, affording an exhaust gas oxidation catalyst with a triple catalyst layer (triple catalyst layer coverage 100% as a proportion of exhaust gas channel surface).

COMPARATIVE EXAMPLE 4

The following slurries were prepared to form the respective catalyst layers.

1) Bottom catalyst layer slurry: A slurry containing cerium oxide-zirconium oxide complex oxide as oxygen-occluding agent, and aluminium oxide (oxygen-occluding agent 63 wt %, aluminium oxide 37 wt %).

2) Intermediate catalyst layer slurry: A slurry containing β-zeolite as hydrocarbon adsorbent, platinum and palladium as catalyst metals (added as platinum nitrate and palladium nitrate), and aluminium oxide (β-zeolite 11.2 wt % as hydrocarbon adsorbent, platinum 1.6 wt %, palladium 0.8 wt %, aluminium oxide 86.4 wt %).

3) Top catalyst layer slurry: A slurry containing β-zeolite as hydrocarbon adsorbent, platinum as catalyst metal (added as platinum nitrate), and aluminium oxide (contains no oxygen-occluding agent; β-zeolite as hydrocarbon adsorbent 63.9 wt %, platinum 0.1 wt %, aluminium oxide 36 wt %).

A honeycomb catalyst substrate (NGK product, 1 L) was immersed in the bottom catalyst layer slurry, which was coated to give a deposit when dry of 49 g/L, dried and then calcined at 500° C. to form a bottom catalyst layer. The intermediate catalyst layer slurry was then coated over the bottom catalyst layer to give a deposit when dry of 110 g/L, dried and then calcined at 500° C. to form an intermediate catalyst layer. The top catalyst layer slurry was then coated over the intermediate catalyst layer to give a deposit when dry of 50 g/L, dried and then calcined at 500° C. to form a top catalyst layer, affording an exhaust gas oxidation catalyst with a triple catalyst layer (triple catalyst layer coverage 100% as a proportion of exhaust gas channel surface).

COMPARATIVE EXAMPLE 5

The following slurries for forming the respective catalyst layers were prepared.

1) Bottom catalyst layer: A slurry containing cerium oxide-zirconium oxide complex oxide as oxygen-occluding agent, aluminium oxide, platinum as catalyst metal (added as platinum nitrate) and β-zeolite as hydrocarbon adsorbent (β-zeolite as hydrocarbon adsorbent 47 wt %, oxygen-occluding agent 29 wt %, aluminium oxide 23.9 wt %, platinum 0.1 wt %).

2) Intermediate catalyst layer slurry: A slurry containing platinum and palladium as catalyst metals (added as platinum nitrate and palladium nitrate), and aluminium oxide (platinum 2.4 wt %, palladium 1.2 wt %, aluminium oxide 96.4 wt %).

3) Top catalyst layer slurry: A slurry containing β-zeolite as hydrocarbon adsorbent, cerium oxide-zirconium oxide complex oxide as oxygen-occluding agent, platinum as catalyst metal (added as platinum nitrate), and aluminium oxide (oxygen-occluding agent 37.5 wt %, β-zeolite as hydrocarbon adsorbent 37.5 wt %, platinum 0.1 wt %, aluminium oxide 24.9 wt %).

A honeycomb catalyst substrate (NGK product, 1 L) was immersed in the bottom catalyst layer slurry, which was coated to give a deposit when dry of 52 g/L, dried and then calcined at 500° C. to form a bottom catalyst layer. The intermediate catalyst layer slurry was then coated over the bottom catalyst layer to give a deposit when dry of 72 g/L, dried and then calcined at 500° C. to form an intermediate catalyst layer. The top catalyst layer slurry was then coated over the intermediate catalyst layer to give a deposit when dry of 81 g/L, dried and then calcined at 500° C. to form a top catalyst layer, affording an exhaust gas oxidation catalyst with a triple catalyst layer (triple catalyst layer coverage 100% as a proportion of exhaust gas channel surface).

COMPARATIVE EXAMPLE 6

The following slurries were prepared to form the respective catalyst layers.
1) Bottom catalyst layer slurry: A slurry containing cerium oxide-zirconium oxide complex oxide as oxygen-occluding agent, and aluminium oxide (oxygen-occluding agent 63 wt %, aluminium oxide 37 wt %).
2) Intermediate catalyst layer slurry: A slurry containing platinum and palladium as catalyst metals (added as platinum nitrate and palladium nitrate), and aluminium oxide (platinum 1.1 wt %, palladium 0.5 wt %, aluminium oxide 98.4 wt %).
3) Top catalyst layer slurry: A slurry containing β-zeolite and ZSM-5 as hydrocarbon adsorbent, cerium oxide-zirconium oxide complex oxide as oxygen-occluding agent, platinum as catalyst metal (added as platinum nitrate), and aluminium oxide (oxygen-occluding agent 27.4 wt %; β-zeolite 25 wt % and ZSM5 zeolite 20 wt % as hydrocarbon adsorbents, platinum 0.1 wt %, aluminium oxide 27.5 wt %).

A honeycomb catalyst substrate (NGK product, 1 L) was immersed in the bottom catalyst layer slurry, which was coated to give a deposit when dry of 49 g/L, dried and then calcined at 500° C. to form a bottom catalyst layer. The intermediate catalyst layer slurry was then coated over the bottom catalyst layer to give a deposit when dry of 110 g/L, dried and then calcined at 500° C. to form an intermediate catalyst layer. The top catalyst layer slurry was then coated over the intermediate catalyst layer to give a deposit when dry of 67 g/L, dried and then calcined at 500° C. to form a top catalyst layer, affording an exhaust gas oxidation catalyst with a triple catalyst layer (triple catalyst layer coverage 100% as a proportion of exhaust gas channel surface).

COMPARATIVE EXAMPLE 7

The following slurries were prepared to form the respective catalyst layers.
1) Bottom catalyst layer slurry: A slurry containing alumina 100 wt % as binder (contains no oxygen-occluding agent).
2) Intermediate catalyst layer slurry: A slurry containing platinum as catalyst metal (added as platinum nitrate), and aluminium oxide (contains no hydrocarbon adsorbent; platinum 3.3 wt %, aluminium oxide 97.9 wt %).
3) Top catalyst layer slurry: A slurry containing 100 wt % aluminium oxide (contains no oxygen-occluding agent and no hydrocarbon adsorbent).

A honeycomb catalyst substrate (NGK product, 1 L) was immersed in the bottom catalyst layer slurry, which was coated to give a deposit when dry of 73 g/L, dried and then calcined at 500° C. to form a bottom catalyst layer. The intermediate catalyst layer slurry was then coated over the bottom catalyst layer to give a deposit when dry of 55 g/L, dried and then calcined at 500° C. to form an intermediate catalyst layer. The top catalyst layer slurry was then coated over the intermediate catalyst layer to give a deposit when dry of 47 g/L, dried and then calcined at 500° C. to form a top catalyst layer, affording an exhaust gas oxidation catalyst with a triple catalyst layer (triple catalyst layer coverage 100% as a proportion of exhaust gas channel surface).

The exhaust gas oxidation catalysts of Working Examples 1-2 and Comparative Examples 1-6 were heat-treated for 50 hours in an oven at 700° C. and then mounted in the exhaust pipe of an in-line 4-cylinder diesel engine. A sulphur poisoning test was conducted at 300° C. using light fuel oil with an addition of 500 ppm of organosulphur compound. The throughput of sulphur was set at 4.6 g/L. The catalyst was then restored by forced regeneration for 15 min at 600° C. using commercial light oil (JIS2). A simulated EC mode test was then conducted and the catalyst performance was evaluated. The results are shown in Table 1.

TABLE 1

| | Catalyst metal content (g/L) | Catalyst layering | Catalyst layers containing hydrocarbon adsorbent | Catalyst layers conversion oxygen-occluding agent | CO containing (%) | THC conversion (%) |
|---|---|---|---|---|---|---|
| Working Example 1 | 2.7 | Triple layer | Top layer Intermediate layer | Top layer Bottom layer | 62.7 | 82.1 |
| Comparative Example 1 | 2.7 | Double layer | Catalyst metal-containing layer | None | 54.3 | 79.8 |
| Comparative Example 2 | 3.9 | Single layer | Single layer containing catalyst metal | None | 54.1 | 85.2 |
| Comparative Example 3 | 2.7 | Triple layer | Top layer | None | 55.0 | 80.1 |
| Comparative Example 4 | 2.7 | Triple layer | Top layer Intermediate layer | Top layer Bottom layer | 58.8 | 80.3 |
| Comparative Example 5 | 2.7 | Triple layer | Top layer Bottom layer | Top layer Bottom layer | 44.4 | 80.1 |
| Working Example 2 | 1.8 | Triple layer | Top layer Intermediate layer | Top layer Bottom layer | 55.6 | 80.5 |
| Comparative Example 6 | 1.8 | Triple layer | Top layer | Top layer Bottom layer | 51.1 | 80.5 |

From the results in Table 1, Working Example 1 has a higher CO conversion than Comparative Examples 1-5 and Working Example 2 has a higher CO conversion than Comparative Example 5, confirming that the exhaust gas oxidation catalyst of the invention has a better exhaust gas cleaning efficacy than the prior art.

The exhaust gas oxidation catalysts of Working Example 3 and Comparative Example 7 were heat-treated for 50 hours in an oven at 700° C. and then mounted in the exhaust gas pipe of an in-line 4-cylinder diesel engine. Using commercial light oil (JIS 2), simulated mode tests were run in the actual exhaust gas, and the temperature (COT50) at which the CO conversion reached 50% was recorded. The results are given in Table 2.

TABLE 2

|  | COT50 |
| --- | --- |
| Working Example 3 | 203 |
| Comparative Example 7 | 212 |

From the results in Table 2, the exhaust gas oxidation catalyst of Working Example 3 has a lower COT50 than the exhaust gas oxidation catalyst of Comparative Example 6, confirming that the invention has superior exhaust gas cleaning efficacy.

WORKING EXAMPLE 4

An exhaust gas oxidation catalyst with a triple catalyst layer (triple catalyst layer coverage 80% as a proportion of exhaust gas channel surface) was obtained using the same bottom catalyst layer slurry, intermediate catalyst layer slurry and top catalyst layer slurry as in Working Example 1: firstly a honeycomb catalyst substrate (NGK product, 1 L) was immersed in the bottom catalyst layer slurry, which was coated to a bottom catalyst layer slurry coverage of 80% of exhaust gas channel length in the catalyst substrate, dried (deposit when dry 49 g/L) and then calcined at 500° C. to form a bottom catalyst layer. The intermediate catalyst layer slurry was then coated over this to a coverage of 100% of exhaust gas channel length, dried (deposit when dry 110 g/L) and then calcined at 500° C. to form an intermediate catalyst layer. The top catalyst layer slurry was then coated over this for a length equal to 80% of exhaust gas channel length at a position overlapping the position of the bottom catalyst layer slurry coating, dried (deposit when dry 50 g/L), and then calcined at 500° C. to form a top catalyst layer.

WORKING EXAMPLE 5

An exhaust gas oxidation catalyst with a triple catalyst layer (triple catalyst layer coverage 50% as a proportion of exhaust gas channel surface) was obtained using the same bottom catalyst layer slurry, intermediate catalyst layer slurry and top catalyst layer slurry as used in Working Example 1: firstly a honeycomb catalyst substrate (NGK product, 1 L) was immersed in the bottom catalyst layer slurry, which was coated to a coverage by bottom catalyst layer slurry equal to 50% of exhaust gas channel length in the catalyst substrate, dried (deposit when dry 49 g/L) and then calcined at 500° C. to form a bottom catalyst layer. The intermediate catalyst layer slurry was then coated over this to a coverage of 100% of exhaust gas channel length, dried (deposit when dry 110 g/L) and then calcined at 500° C. to form an intermediate catalyst layer. The top catalyst layer slurry was then coated over this for a length equal to 50% of exhaust gas channel length at a position overlapping the position of the bottom catalyst layer slurry coating, dried (deposit when dry 50 g/L), and then calcined at 500° C. to form a top catalyst layer.

The exhaust gas oxidation catalysts of Working Examples 4 and 5 were tested under the same conditions as in Working Example 1. The results are shown in Table 3.

TABLE 3

|  | CO conversion (%) | THC conversion (%) |
| --- | --- | --- |
| Working Example 4 | 59.7 | 79.2 |
| Working Example 5 | 56.2 | 75.6 |
| Comparative Example 1 | 54.3 | 79.8 |

From the results in Table 3, the exhaust gas oxidation catalysts of Working Examples 4 and 5 have a higher CO conversion than the exhaust gas oxidation catalyst of Comparative Example 1, confirming that they have superior exhaust gas cleaning efficacy.

For the avoidance of doubt any and all patent or other publications referred to herein are incorporated herein by reference in their entirety.

KEY TO DRAWINGS

1 Exhaust gas oxidation catalyst
2 Exhaust gas channel
3 Catalyst substrate
4 Exhaust gas channel surface
5 Catalyst layer
6 Bottom catalyst layer
7 Intermediate catalyst layer
8 Top catalyst layer

The invention claimed is:

1. An exhaust gas oxidation catalyst comprising a catalyst substrate having a plurality of exhaust gas channels and a catalyst layer formed on the surface of the exhaust gas channels in the catalyst substrate; wherein a catalyst layer consisting of a bottom catalyst layer, a top catalyst layer exposed in the exhaust gas channels, and an intermediate catalyst layer located between the bottom catalyst layer and top catalyst layer, is provided so as to cover not less than 25% of the exhaust gas channel surface, and wherein the bottom catalyst layer contains at least an oxygen-occluding agent as catalyst component but does not contain a hydrocarbon adsorbent, the intermediate catalyst layer contains at least catalyst metal, supported on a metal oxide support, and a hydrocarbon adsorbent as catalyst components, and the top catalyst layer contains at least an oxygen-occluding agent and a hydrocarbon adsorbent as catalyst components.

2. The exhaust gas oxidation catalyst according to claim 1, wherein the intermediate catalyst layer consists of two or more layers that have different catalyst components and/or contents.

3. The exhaust gas oxidation catalyst of claim 1 wherein the top catalyst layer further contains catalyst metal supported on a metal oxide support.

4. The exhaust gas oxidation catalyst according to claim 3, wherein 1-10 wt % of the overall catalyst metal content is contained in the top catalyst layer.

5. The exhaust gas oxidation catalyst according to claim 1, wherein the catalyst metal is platinum, palladium, iridium, gold, silver or a mixture of both platinum and palladium.

6. The exhaust gas oxidation catalyst according to claim 1, wherein each of the intermediate catalyst layer and the top catalyst layer contains 0.2-5.0 wt % catalyst metal relative to the combined weight of the catalyst metal and the metal oxide.

7. The exhaust gas oxidation catalyst according to claim 1, wherein the hydrocarbon adsorbent in the top catalyst layer or the intermediate catalyst layer is a zeolite or a metallosilicate structure wherein silicon or aluminium in a zeolite crystal lattice is replaced with a transition metal.

8. The exhaust gas oxidation catalyst according to claim 7, wherein the zeolite is of the BEA, FAU, MFI, FER or CHA type or a mixture of any two or more thereof.

9. The exhaust gas oxidation catalyst according to claim 1, wherein the oxygen-occluding agent in the top catalyst layer and the bottom catalyst layer is cerium oxide, a complex oxide of cerium and zirconium, or cerium oxide or a complex oxide of cerium and zirconium to which lanthanum, praseodymium or neodymium has been added.

10. The exhaust gas oxidation catalyst according to claim 1 comprising 10-20 g/L of oxygen occluding agent, 5-30 g/L of hydrocarbon adsorbent and 0.1-5.0 g/L of catalyst metal.

11. The exhaust gas oxidation catalyst according to claim 1, wherein 20-50 wt % of the overall oxygen-occluding agent content is contained in the bottom layer.

12. The exhaust gas oxidation catalyst according to claim 1, wherein 30-50 wt % of the overall hydrocarbon adsorbent content is contained in the top catalyst layer.

13. The exhaust gas oxidation catalyst according to claim 1, wherein the catalyst substrate is of honeycomb cylindrical form, wherein the exhaust gas channels run from one face through to another face of the cylinder; or the catalyst substrate is a porous body in fibre form, sheet form or ceramic form.

14. The exhaust gas oxidation catalyst according to claim 1, wherein the catalyst substrate and the bottom catalyst layer are formed integrally as a honeycomb cylinder.

15. The exhaust gas oxidation catalyst according to claim 1, wherein the bottom layer is formed from a slurry coating on the catalyst substrate.

16. An exhaust system for a diesel internal combustion engine comprising the exhaust gas oxidation catalyst according to claim 1.

17. An exhaust system according to claim 16 comprising a diesel particulate filter.

18. The exhaust gas oxidation catalyst according to claim 1, wherein 30-50 wt % hydrocarbon adsorbent content is contained in the intermediate catalyst layer and 50-70 wt % of the overall hydrocarbon adsorbent is contained in the top catalyst layer.

* * * * *